United States Patent [19]

Fassel et al.

[11] Patent Number: 4,575,609

[45] Date of Patent: Mar. 11, 1986

[54] CONCENTRIC MICRO-NEBULIZER FOR DIRECT SAMPLE INSERTION

[75] Inventors: Velmer A. Fassel, Ames; Gary W. Rice, Nevada; Kimberly E. Lawrence, Ames, all of Iowa

[73] Assignee: The United States of America as represented by the United States Department of Energy, Washington, D.C.

[21] Appl. No.: 586,611

[22] Filed: Mar. 6, 1984

[51] Int. Cl.[4] .......................... B23K 9/00; G01N 21/73
[52] U.S. Cl. ........................ 219/121 PY; 219/121 PR; 219/121 PQ; 315/111.51; 239/424.5; 356/316
[58] Field of Search ...... 219/121 P, 121 PY, 121 PM, 219/121 PR, 121 PN, 121 PQ, 76.10; 356/316; 239/338, 424, 135, 425, 124, 424.5, 427.5; 315/111.21, 111.51; 313/231.31, 231.41

[56] References Cited

U.S. PATENT DOCUMENTS

| | | | |
|---|---|---|---|
| 3,199,789 | 8/1965 | James | 239/423 |
| 3,472,455 | 10/1969 | Johnson et al. | 239/135 |
| 3,584,792 | 6/1971 | Johnson | 239/338 |
| 3,915,386 | 10/1975 | Vora | 239/338 |
| 4,116,387 | 9/1978 | Kremer, Jr. et al. | 239/338 |
| 4,147,957 | 4/1979 | Hildebrand | 356/316 |
| 4,225,235 | 9/1980 | Anderson et al. | 356/316 |
| 4,284,590 | 8/1981 | De Boer, Jr. et al. | 239/424.5 |
| 4,293,220 | 10/1981 | Denton et al. | 356/316 |
| 4,470,699 | 9/1984 | Gay | 356/316 |
| 4,482,246 | 11/1984 | Meyer et al. | 219/121 PM |

OTHER PUBLICATIONS

Direct Liquid Sample Introduction into an Inductively Coupled Argon Plasma, Rice et al., Abstract #145, Pittsburgh Conference, Ames Lab.

Primary Examiner—M. H. Paschall
Attorney, Agent, or Firm—James W. Weinberger; Walter L. Rees; Judson R. Hightower

[57] ABSTRACT

A concentric micro-nebulizer and method for introducing liquid samples into a plasma established in a plasma torch including a first tube connected to a source of plasma gas. The concentric micro-nebulizer has inner and outer concentric tubes extending upwardly within the torch for connection to a source of nebulizer gas and to a source of liquid solvent and to a source of sample liquid. The inner tube is connected to the source of liquid solvent and to the source of sample liquid and the outer tube is connected to the source of nebulizer gas. The outer tube has an orifice positioned slightly below the plasma when it is established, with the inner and outer tubes forming an annulus therebetween with the annular spacing between the tubes at said orifice being less than about 0.05 mm. The dead volume of the inner tube is less than about 5 microliters.

20 Claims, 2 Drawing Figures

CONCENTRIC MICRO-NEBULIZER FOR DIRECT SAMPLE INSERTION

CONTRACTUAL ORIGIN OF THE INVENTION

The United States Government has rights in this invention pursuant to Contract No. W-7405-ENG-82 between the U.S. Department of Energy and Iowa State University.

BACKGROUND OF THE INVENTION

The coupling of flow injection analysis (FIA) or high performance liquid chromatography (HPLC) techniques to inductively coupled plasma-atomic emission spectroscopy (ICP-AES) offers new and attractive approaches for the determination of elemental concentrations in a wide variety of sample matrices. Several advantages of FIA over continuous flow methods for sample introduction into the ICP have been discussed, and one of the most attractive features that FIA offers is a rapid and precise means of automating sample introduction into an ICP for simultaneous, multielement analysis at the trace, minor, and major constituent level with minimal sample consumption. The utilization of the ICP as a detector for HPLC retains most of the advantages of FIA-ICP, while providing the analyst with a powerful and versatile means of compound separation. This added dimension becomes particularly important when metal speciation is of primary interest, rather than total metal content.

To date, the coupling of FIA and HPLC to the ICP has only been accomplished using conventional cross-flow, concentric, or Babington-type pneumatic nebulizers. Limits of detection under these conditions have generally been observed to be poorer when compared to conventional continuous sample flow conditions. These limitations have been attributed to the large dead-volume and sample losses associated with conventional nebulizers, and band broadening of eluents from FIA transfer tubing or HPLC columns prior to entering the nebulizer unit.

SUMMARY OF THE INVENTION

In order to obviate the difficulties encountered with conventional nebulizers, it is an object of the invention to develop a micro-concentric nebulizer which is inserted directly into the tip of a conventional sample introduction tube of an ICP torch, wherein the nebulization occurs at the micro-nebulizer orifice directly below the plasma resulting in substantially one hundred percent efficiency of the nebulizer.

A principal object of the present invention is to provide a concentric micro-nebulizer for introducing liquid samples into a plasma established in a plasma torch including a first tube connected to a source of plasma gas, the concentric micro-nebulizer comprising inner and outer concentric tubes extending upwardly within the first tube for connection to a source of nebulizer gas and to a source of liquid solvent and to a source of sample liquid, the inner tube being constructed and arranged for connection to the source of liquid solvent and to the source of sample liquid and the outer tube being constructed and arranged for connection to the source of nebulizer gas, the outer tube having an orifice positioned slightly below the plasma when it is established, the inner and outer tubes forming an annulus therebetween with the annular spacing between the tubes at the orifice being less than about 0.05 mm, the volume of the inner tube between the end thereof near the orifice and the connection thereof to the source of sample liquid being less than about 5 microliters.

Another object of the invention is to provide a method of introducing a liquid sample into a plasma, comprising establishing a plasma from a source of plasma gas, providing a nebulizer with the orifice thereof near the base of the plasma, establishing a liquid solvent stream from a source thereof to the plasma through the nebulizer orifice, providing a source of liquid sample in communication with the liquid solvent stream, introducing a nebulizer gas into the liquid solvent stream at the nebulizer orifice to establish an aerosol flow through the nebulizer orifice at a velocity not less than about 100 meters/sec., whereby to introduce solvent and sample into the plasma at a velocity sufficient to prevent the nebulizer orifice from clogging.

A still further object of the present invention is to provide a method of introducing a liquid sample into a plasma comprising establishing a plasma from a source of plasma gas, providing a nebulizer having inner and an outer concentric tubes defining an annular space therebetween in the range of from about 0.02 mm to about 0.04 mm with the outer tube having an orifice slightly below the plasma base, establishing a liquid solvent stream from a source thereof to the plasma through the inner tube, introducing liquid sample in discrete doses into the liquid solvent stream, introducing a nebulizer gas through the outer tube into the liquid solvent stream at the nebulizer orifice to establish an aerosol flow through the nebulizer orifice at a velocity not less than about 100 meters/sec., the volume of solvent and sample stream between the nebulizer orifice and the introduction of the sample into the solvent stream being less than about 5 microliters.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
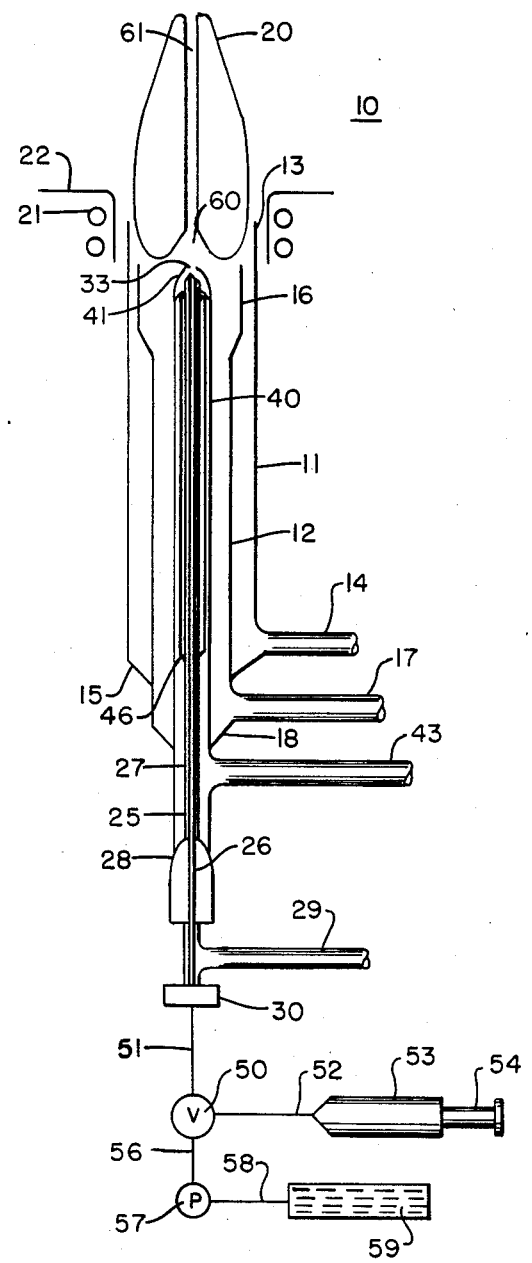
FIG. 1 is a schematic side elevational view of a plasma torch assembly connected to a reservoir of solvent and liquid sample source showing the micro-concentric nebulizer.

Referring now to the Figures there is illustrated a plasma torch assembly 10 having a first torch sleeve 11 and a second torch sleeve 12 concentrically located therewithin. The first torch sleeve 11 has an opening at the top edge 13 and is closed near the bottom 15 thereof except for a line 14 connected to a source of plasma gas which is argon. The second torch sleeve 12 has an enlarged upper end 16 which terminates below the end 13 of the first torch sleeve 11 and is closed at the bottom 18 thereof except for a line 17 connected to a source of auxiliary plasma gas, which again is argon.

A plasma 20 is established by known means including a series of RF coils 21 positioned around the top end 13 of the first sleeve 11 and protected from arcing by means of a quartz shield 22. A concentric-micro nebulizer 25 is positioned within the torch sleeves 11 and 12 and particularly positioned inside a previously used sample introduction tube, as will be described. The concentric-micro nebulizer 25 includes a liquid transfer inner tube 26 surrounded by a gas transporting outer tube 27, the outer tube 27 being connected at its bottom to a fitting 28 which is in communication with a line 29 leading to a source of nebulizing gas which is argon. The line 29 is connected in gas tight relation to a fitting 30, thereby to provide a gas tight construction, as is well known in the art.

Figure 2:
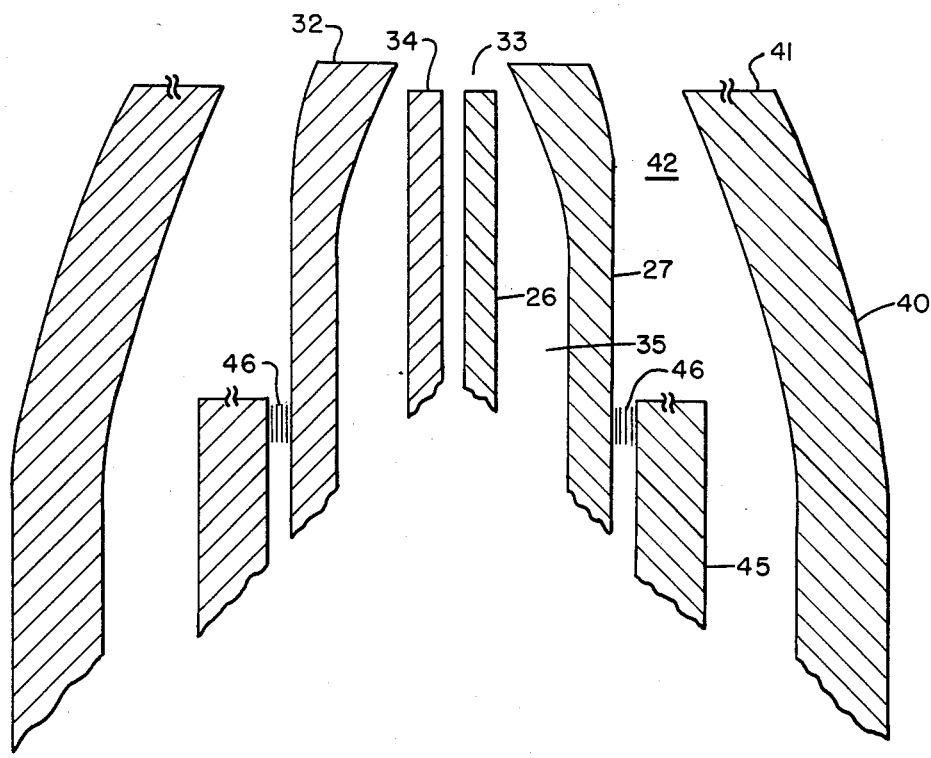
FIG. 2 is an enlarged sectional view of the tip of the micro-nebulizer positioned just below the plasma in the torch assembly.

The gas transporting outer tube 27 has a tapered end 32, as best seen in FIG. 2, which tapers inwardly to form an orifice 33 which is slightly above the upper end 34 of the liquid transport inner tube 26. The inner tube 26 and the outer tube 27 are concentric and form therebetween an annulus 35.

Positioned around the outer tube 27 is what heretofore has been used in the art as the sample introduction tube 40 for ICP, the prior art sample introduction tube having a tapered end 41 which extends inwardly toward the outer tube 27, the tube 27 and the tube 40 being concentrically positioned and forming an annulus or annular space 42 therebetween. The prior art sample introduction tube 40 is connected to a gas line 43 which in turn is connected to a source of auxiliary nebulizing gas, which is argon. The bottom end of the prior art sample introduction tube connected in a gas tight relationship to the fitting 28. Finally, the micro-nebulizer 25 includes a stiffening tube 45 preferably of a ceramic which surrounds the outer tube 27 and is connected thereto at both ends of the stiffening tube by means of an epoxy resin 46.

A valve 50 is connected by a line 51 to the fitting 30 and is in fluid communication with the inner tube 26. The valve 50 is also connected by a line 52 to a source of liquid sample which may be a syringe 53 having a plunger 54. The valve 50 is further connected by a line 56 to a high pressure pump 57 which is in fluid communication through a line 58 to a reservoir of liquid solvent 59. When operated, as hereinafter set forth, the micro-nebulizer 25 produces at the nebulizer orifice 33 an aerosol 60 directly below the axial channel 61 of the plasma 20.

Operation of the plasma torch assembly 10 is well known in the art and includes providing argon gas through line 14 and if necessary through line 17 so as to provide primary and auxiliary argon flow to the sleeves 11 and 12 past the RF coils 21, thereby to establish a plasma 20, all as well known in the art, it being understood that the RF power supply and other well known instrumentation sake of brevity, ICP-AES requires nebulization of a liquid sample to the plasma and this is provided by the micro-nebulizer 25.

Solvent from the reservoir 59 is pumped by the pump 57 through the line 56 and the valve 50, the line 51 into the inner liquid transfer tube 26 and thence upwardly toward the upper end 34 thereof. Simultaneously, nebulizer gas (argon) is introduced through a line 29 from a source of argon to the outer tube 27 and thereafter the argon flows upwardly through the annular space 35 until it flows through the constriction or orifice 33 between the upper end 34 of the liquid sample tube 26 and the inwardly tapered end 32 of the outer gas transport tube 27. At the orifice 33, an aerosol is formed by action of the nebulizer argon gas flowing upwardly through the annular space 35 coming into contact with the liquid flowing upwardly from the inner tube 26. Since the orifice 33 is positioned just below and in axial alignment with the plasma 20 there is a direct introduction of the solvent and sample aerosol into the plasma by means of the micro-nebulizer 25. If desirable, an auxiliary argon nebulizer gas may be provided through line 43 for cooling purposes, the auxiliary argon flowing upwardly between the prior art sample introduction tube 40 and the outer tube 27 in the annular space 42 therebetween.

When a liquid sample is desired to be injected into the solvent stream, a discrete dose is loaded by means of the syringe 53 and plunger 54 into the valve 50, manipulation of which causes the solvent from the reservoir 59 to flow through the sample dose held within the valve 50 and thence upwardly through line 51 into the inner tube 26. The valve 50 is well known in the art and is used to load discrete doses of liquid sample into the solvent line at predetermined intervals.

Some of the advantages of the micro-nebulizer 25 include the substantially one hundred percent transportation of the aerosol 60 to the plasma 20. In prior art nebulizers, the nebulizer was located a substantial distance, perhaps one to two feet, from the plasma whereby only a small fraction on the order of 1 to 10 percent of the aerosol produced was transported to the plasma. With the present invention, substantially all of the aerosol produced is transported to the plasma since the aerosol is produced at the nebulizer orifice 33 which is substantially adjacent to the plasma 20.

Yet another advantage of the micro-nebulizer 25 is the small dead volume which is defined as the volume in the line between the end 34 of the tube 26 and the valve 50, as illustrated. Where a HPLC column is used, the dead volume is calculated from the top of the column to the top 34 of the inner tube 26. In any event, the micro-nebulizer 25 has a very small dead volume compared to the prior art which results in reduced band broadening of eluents from either the FIA transfer tubing or the HPLC column prior to entering the nebulizer unit.

In a constructional example of the micro-nebulizer 25, the inner liquid tube 26 had a 0.19 mm outside diameter and a 0.05 mm inside diameter and was made of fused silica, the tube being purchased from the Spectran Corporation in Sturbridge, Mass. The outer nebulizer gas tube 27 was a fused silica capillary tube having a 0.70 mm outer diameter and a 0.50 mm inside diameter. The end 32 of the tube 27 was tapered to a 0.25 mm orifice 33. The 0.03 mm annular spacing 35 between the inner and outer tubes 26 and 27 at the orifice 33 creates a high velocity nebulizing argon gas flow capable of producing an aerosol for direct introduction into the axial channel 61 of the plasma 20. The ceramic insulating tube 45 was made the Ventron Corporation, Alfa Products, Beverly, Mass. and was a ceramic tube having a 1.6 mm outside diameter and a 0.8 mm inside diameter. The gap between the outer tube 27 and the ceramic tube 45 was sealed with an epoxy resin. The auxiliary nebulizer argon flow was carried between the prior art sample introduction tube 40 having an outer diameter of 6 mm and an inner diameter of 4 mm and the ceramic stiffening tube 45.

The prior art sample introduction tube tapers at the top 41 thereof to an opening 1 mm in diameter. The solvent was drawn from the reservoir 59 through the high pressure, single piston pump (Model 112, Beckman Instruments, Inc., Berkley, Calif.) into a syringe loading sample loop injector 53 (Model 7125 Rheodyne, Inc. Cotati, Calif.). Sample volumes of 10 micro liters were used in the FIA mode and 5 micro liter volumes for the HPLC mode.

Analyte solutions injected from the syringe 53 through the valve 50 were transported by the solvent stream through the line 51 which was a 12 centimeter length of 0.25 mm internal diameter stainless steel tubing lined with a 0.19 mm outside diameter by 0.10 mm internal diameter fused silica capillary for FIA, or through a 1 mm internal diameter by a 50 cm $C_{18}$ microbore column for HPLC (not shown). Effluents from the column passed directly into the inner tube 26 of the micro-nebulizer 25 and thence to the base of the plasma 20 where direct nebulization occurred at the orifice 33 transporting substantially the entire aerosol 60 produced into the plasma 20. The dead volume between the ends of the FIA transfer tubing or the HPLC columns to the top 34 of the inner tube 26 or the nebulizer orifice 33 was approximately 1.5 microliters.

The plasma operating conditions and detection facilities are summarized in Table I hereinafter set forth.

TABLE 1

| Plasma Operating Conditions and Detection Facilities | |
|---|---|
| Plasma: | Plasma-Therm, Inc., Kresson, NJ |
| HF generator: | Model HPS-5000D |
| Power: | 1.8 kW forward power |
| Plasma Ar Flow Rate: | 17 L/min |
| Auxiliary plasma Ar flow rate: | 0.5 L/min |
| Neubulizer Ar flow rate:[a] | 0.2 L/min |
| Auxiliary nebulizer Ar flow rate[b] | 0.6 L/min |
| Vertical observation height: | 16 mm |
| Monochromator: | McPherson Model 2051 |
| Focal length: | 1 m |
| Grating | 2400 grooves/mm blazed for 250 nm |
| Slit widths: | 20 m |
| Amplifier: | Model 417, Keithly Instruments, Inc., Cleveland, OH. |
| Strip Chart Recorder: Model #250-1, Curken | Scientific, Inc., Danbury, CT. |

[a]Defined as the argon flow in the micro-concentric nebulizer.
[b]Defined as the argon flow in the annular space between the micro-concentric nebulizer and the normal sample introduction tube.

Various solutions of magnesium, manganese, cadmium, chromium, arsenic, selenium, mercury, strontium, cobalt, barium and lead were prepared and run through the micro-nebulizer 25. A stable plasma was maintained during the direct introduction of aqueous aerosol at flow rates of up to 200 microliters/minute, and methanol, acetonitrile or methyl-isobutylketone at flow rates up to 150 microliters/minute. In comparison, typical aqueous sample volumes introduced into the ICP from conventional pneumatic and ultrasonic nebulizers are on the order of 20 microliters/minute and 200 microliters/minute (with desolvation), respectively, assuming a solution uptake of 2.0 ml/minute and 1% and 10% nebulization-transport efficiencies, respectively. It is assumed but not known that the greater tolerance of the plasma to solvents from the concentric micro-nebulizer 25 may be attributed to the high linear velocity at which the aerosol 60 passes through the axial channel 61 of the plasma 20.

Various parameters of the micro-nebulizer 25 are important to its performance. The annular space 35 at the orifice 33 should be less than about 0.05 mm and preferably is in the range of from about 0.02 mm to about 0.04 mm. The dead volume of the liquid sample should be less than about 5 microliters and preferably about 2 microliters and the end 34 of the tube 26 should be spaced a distance in the range of from about 0.04 mm to about 0.06 mm below the orifice 33 of the tube 27 and preferably is about 0.03 mm below the orifice.

The high velocity of the aerosol 60 produced at the nebulizer orifice 33 is also important and should be maintained not less than about 100 meters/sec. and should be in the range of from about 100 meters/sec. to about 150 meters/sec. The preferred velocity of the aerosol through the orifice is about 120 meters/sec. Another important aspect of the performance of the micro-nebulizer 25 is the flow rate of the liquid through the inner tube 26. Preferably, the flow rate should not be greater than about 150 microliters/minute nor should it be less than about 100 microliters/minute. The micro-nebulizer 25 can be operated at a flow rate of about 10 microliters/minute; however, the sensitivity is unsatisfactory at this low flow rate. Moreover, the preferred flow rate is in the range of from about 120 microliters/minute to about 150 microliters/minute, flow rates outside of this preferred range resulting in the peaks broadening out resulting in less sensitive readings.

The auxiliary nebulizer gas flow is used principally as a coolant in the micro-nebulizer 25 and not to further nebulize the liquid transported through the inner tube 26. Accordingly, the flow rate of the auxiliary nebulizer gas is not a critical aspect of the invention nor is its presence. The flow rates in combination with the velocities of the aerosol 60 through the orifice 33 combine to prevent clogging of the nebulizer 25 and to date, no clogging of the nebulizer 25 has occurred even when nebulizing solvents containing relatively high salt concentrations. Finally, the instrumentation associated with ICP-AES has not been illustrated, as all instrumentation is commercially available and well known and may include a monochromator, amplifier and recorder.

While there has been described what at present is considered to be the preferred embodiment of the present invention, it will be understood that various modifications and alterations may be made therein without departing from the true spirit and scope of the invention which is intended to be covered in the claims appended hereto.

We claim:

1. A concentric micro-nebulizer for introducing liquid samples into a plasma established in a plasma torch including a first tube connected to a source of plasma gas, said concentric micro-nebulizer comprising inner and outer concentric tubes extending upwardly within the first tube for connection to a source of nebulizer gas and to a source of liquid solvent and to a source of sample liquid, said inner tube being constructed and arranged for connection to the source of liquid solvent and to the source of sample liquid and said outer tube being constructed and arranged for connection to the source of nebulizer gas, said outer tube having an orifice positioned slightly below the plasma when it is established, said inner and outer tubes forming an annulus therebetween with the annular spacing between said tubes at said orifice being less than about 0.05 mm around the entire periphery thereof, the volume of said inner tube between the end thereof near said orifice and the connection thereof to the source of sample liquid being less than about 5 microliters.

2. The concentric micro-nebulizer of claim 1, wherein the annular spacing between said inner and outer tubes at said orifice is in the range of from about 0.02 mm to about 0.04 mm.

3. The concentric micro-nebulizer of claim 1, wherein said orifice diameter is about 0.25 mm and the outer diameter of said inner tube is about 0.19 mm to provide an annular spacing of about 0.03 mm.

4. The concentric micro-nebulizer of claim 1, wherein the end of said outer tube forming said orifice is tapered inwardly such that the orifice diameter is about one half the inner diameter of said outer tube.

5. The concentric micro-nebulizer of claim 1, and further comprising pump means for transmitting the nebulized liquid solvent and sample through said orifice at a velocity of not less than about 100 meters/sec.

6. The concentric micro-nebulizer of claim 5, wherein the velocity through said orifice is in the range of from about 100 meter/sec. to about 150 meters/sec.

7. The concentric micro-nebulizer of claim 1, and further comprising a second tube between the first tube and said concentric micro-nebulizer, said second tube and said outer tube of said concentric micro-nebulizer forming an annular space connected to a source of nebulizer gas to provide auxiliary nebulizer gas to the aerosol formed from the nebulizer gas and liquid solvent and sample liquid.

8. The concentric micro-nebulizer of claim 7, and further comprising a ceramic stiffening tube between said second tube and said outer tube, said ceramic stiffening tube being sealed at both ends thereof to said outer tube.

9. The concentric micro-nebulizer of claim 1, wherein the volume of said inner tube between the end thereof near said orifice and the connection thereof to the source of sample liquid is less than about 2 microliters.

10. The concentric micro-nebulizer of claim 1, wherein the end of said inner tube is positioned about 0.03 mm below said outer tube orifice.

11. A method of introducing a liquid sample into a plasma, comprising establishing a plasma from a source of plasma gas, providing a nebulizer with the orifice thereof near the base of the plasma, establishing a liquid solvent stream from a source thereof to the plasma through the nebulizer orifice, providing a source of liquid sample in communication with the liquid solvent stream, introducing a nebulizer gas into the liquid solvent stream at the nebulizer orifice to establish an aerosol flow through the nebulizer orifice at a velocity not less than about 100 meters/sec., whereby to introduce solvent and sample into the plasma at a velocity sufficient to prevent the nebulizer orifice from clogging.

12. The method of claim 11, wherein substantially all of the aerosol produced is transmitted to the plasma.

13. The method of claim 11, wherein the liquid sample is introduced in discrete doses to the liquid solvent.

14. The method of claim 11, wherein the plasma gas and the nebulizer gas are argon.

15. The method of claim 11, wherein the aerosol velocity at the nebulizer orifice is less than about 150 meters/sec.

16. A method of introducing a liquid sample into a plasma comprising establishing a plasma from a source of plasma gas, providing a nebulizer having inner and an outer concentric tubes defining an annular space therebetween in the range of from about 0.02 mm to about 0.04 mm around the entire periphery thereof with the outer tube having an orifice slightly below the plasma base, establishing a liquid solvent stream from a source thereof to the plasma through the inner tube, introducing liquid sample in discrete doses into the liquid solvent stream, introducing a nebulizer gas through the outer tube into the liquid solvent stream at the nebulizer orifice to establish an aerosol flow through the nebulizer orifice at a velocity not less than about 100 meters/sec., the volume of solvent and sample stream between the nebulizer orifice and the introduction of the sample into the solvent stream being less than about 5 microliters.

17. The method of claim 16, wherein the end of the inner tube is in the range of from about 0.04 mm to about 0.06 mm below the outer tube orifice.

18. The method of claim 16, wherein the aerosol velocity through the nebulizer orifice is less than about 150 meters/sec.

19. The method of claim 16, wherein the liquid flow rate is in the range of from about 100 microliters/minute to about 150 microliters/minute.

20. The method of claim 16, wherein the plasma gas and the nebulizer gas are argon and an auxiliary stream of argon gas is provided surrounding the outer tube orifice and the liquid flow rate is in the range of from about 120 microliters/minute to about 150 microliters/-minute.

* * * * *